(12) United States Patent
Kaminagayoshi et al.

(10) Patent No.: US 7,136,080 B1
(45) Date of Patent: Nov. 14, 2006

(54) ENTERTAINMENT SYSTEM, ENTERTAINMENT APPARATUS, RECORDING MEDIUM, AND PROGRAM PROVIDING COLOR CODED DISPLAY MESSAGES

(75) Inventors: Takehiro Kaminagayoshi, Tokyo (JP); Hidekazu Shimamura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 239 days.

(21) Appl. No.: 09/653,286

(22) Filed: Aug. 31, 2000

(30) Foreign Application Priority Data

Sep. 2, 1999 (JP) ................................ 11-249364

(51) Int. Cl.
*G09G 5/00* (2006.01)

(52) U.S. Cl. ...................... 345/619; 715/706; 715/705; 463/30; 463/31

(58) Field of Classification Search ........ 345/705–706, 345/715; 707/512; 463/30, 31; 434/118
See application file for complete search history.

(56) References Cited

U.S. PATENT DOCUMENTS

| | | | |
|---|---|---|---|
| 5,736,982 A * | 4/1998 | Suzuki et al. ................ | 345/706 |
| 6,191,772 B1 * | 2/2001 | Mical et al. ................. | 345/698 |
| 6,241,524 B1 * | 6/2001 | Aoshima et al. ............. | 434/118 |
| 6,290,602 B1 * | 9/2001 | Kawano ........................ | 463/23 |
| 6,296,570 B1 * | 10/2001 | Miyamoto et al. ............ | 463/30 |
| 6,409,603 B1 * | 6/2002 | Nishino et al. ............... | 463/43 |
| 6,434,604 B1 * | 8/2002 | Harada et al. ............... | 709/207 |
| 6,538,666 B1 * | 3/2003 | Ozawa et al. ................ | 345/728 |

FOREIGN PATENT DOCUMENTS

| | | |
|---|---|---|
| JP | 61-32135 | 2/1986 |
| JP | 62-159176 | 7/1987 |
| JP | 9-233442 | 9/1997 |
| JP | 11-207035 | 8/1999 |

OTHER PUBLICATIONS

ASCII Corporation; Monthly Magazine "LOGIN" vol. 3; No. 11; Photo on the bottom of p. 14; Issued on Nov. 1, 1984.
Japanese Patent Office; Japanese "Rejection of the Application" mailed Jul. 2, 2002 with English translation of pertinent portion; pp. 1-4.
Reimer, Jeremy, "The evolution of gaming: computers, consoles and arcade, Massively multiplayer online role-playing games," Oct. 10, 2005, pp. 1-5, available under http://arctechnica.com/articles/paedia/gaming-evolution.arc/4.
European Patent Office, "Summons to attend oral proceedings pureuent to Rule 71(1) EPC" for corresponding European Patent Application No. 00307836.1-2215, Feb. 6, 2006, 3 pp.

* cited by examiner

*Primary Examiner*—Kee M. Tung
*Assistant Examiner*—Chante Harrison
(74) *Attorney, Agent, or Firm*—Fitch, Even, Tabin & Flannery

(57) ABSTRACT

An entertainment system comprises display color code setting means for setting a suitable display color code for each of undefined display color codes in unprocessed message data, the message data generating means for generating message data by dividing the unprocessed message data into line unit data sections each comprising one-line data based on the number of lines in the message and storing the generated message data in a buffer for displaying the message, and message data outputting means for starting display of the message from a point having coordinates indicated by a coordinate code such that each of character strings of data units is displayed in a color indicated by a display color code. If an undefined display color code is included in the message data, the display color code setting means determines the type of a word having the undefined color code and defines the undefined color code based on the determined type.

12 Claims, 17 Drawing Sheets

DISPLAY COLOR INFORMATION TABLE (330)

| DATA UNIT | IDENTIFICATION FLAG | | | | | |
|---|---|---|---|---|---|---|
| | PERSON'S NAME UNIT | | PLACE'S NAME UNIT | | MONSTER'S NAME UNIT | |
| ×××× | 1 | 0 | 0 | 0 | 0 | 0 |
| ×××× | 0 | 1 | 0 | 0 | 0 | 0 |
| ☐☐☐☐ | 0 | 0 | 1 | 0 | 0 | 0 |
| ☐☐☐☐ | 0 | 0 | 0 | 1 | 0 | 0 |
| △△△△ | 0 | 0 | 0 | 0 | 1 | 0 |
| △△△△ | 0 | 0 | 0 | 0 | 0 | 1 |

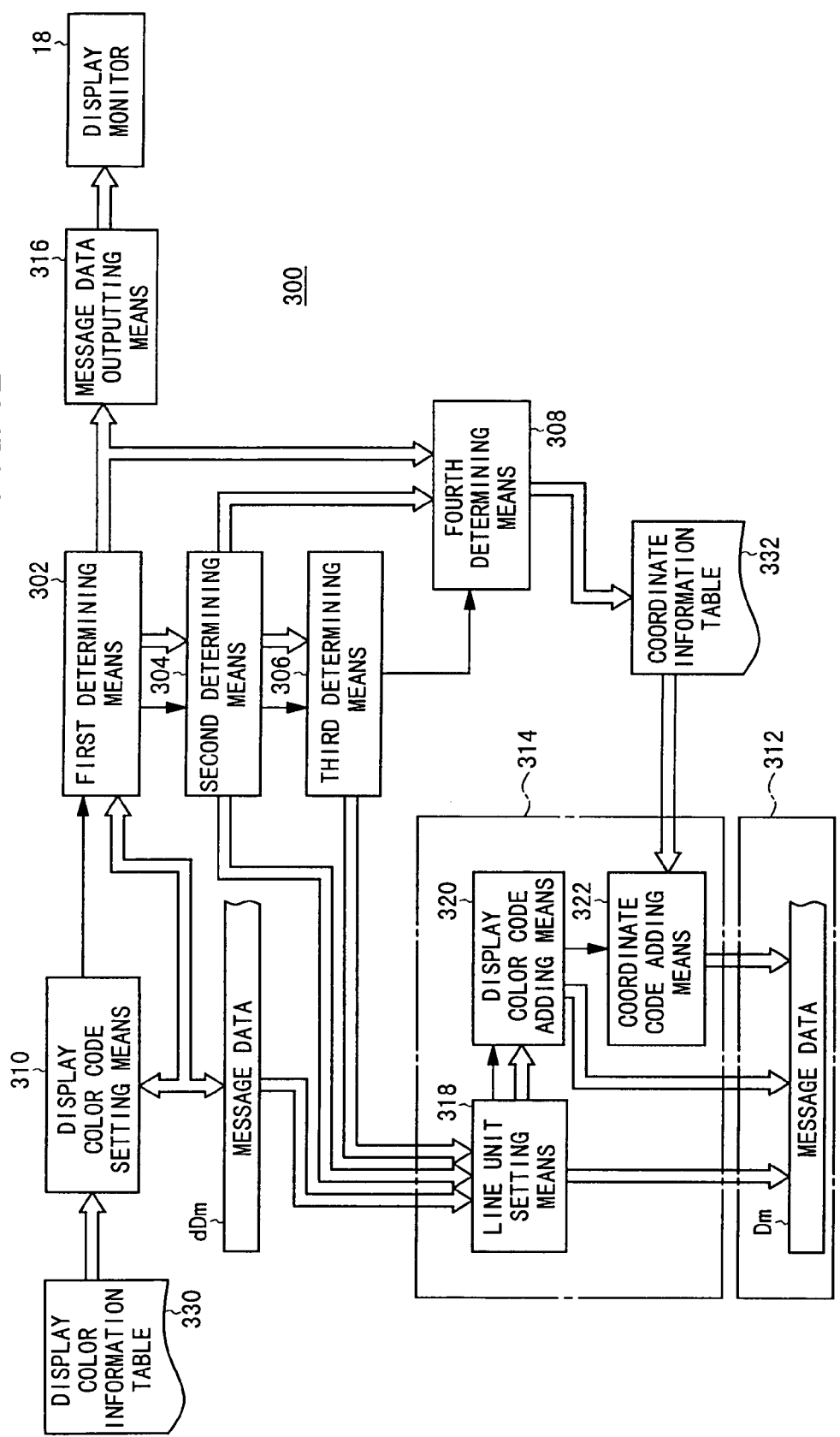

FIG. 16

DISPLAY COLOR INFORMATION TABLE (330)

| DATA UNIT | IDENTIFICATION FLAG | | | | | |
|---|---|---|---|---|---|---|
| | PERSON'S NAME UNIT | | PLACE'S NAME UNIT | | MONSTER'S NAME UNIT | |
| ××××  | 1 | 0 | 0 | 0 | 0 | 0 |
| ××××  | 0 | 1 | 0 | 0 | 0 | 0 |
| □□□□ | 0 | 0 | 1 | 0 | 0 | 0 |
| □□□□ | 0 | 0 | 0 | 1 | 0 | 0 |
| △△△△ | 0 | 0 | 0 | 0 | 1 | 0 |
| △△△△ | 0 | 0 | 0 | 0 | 0 | 1 |
| | | | | | | |
| | | | | | | |

ENTERTAINMENT SYSTEM, ENTERTAINMENT APPARATUS, RECORDING MEDIUM, AND PROGRAM PROVIDING COLOR CODED DISPLAY MESSAGES

BACKGROUND OF THE INVENTION

1. Field of the Invention

The present invention relates to an entertainment system which displays a message on a display monitor such that words of a same type in the message are displayed in a same color for making it possible to easily understand the meaning of unknown words. Further, the present invention relates to an entertainment apparatus which is used for executing various programs and constitutes the entertainment apparatus, a recording medium which stores programs and data for use of the entertainment system, and a program itself.

2. Description of the Related Art

Some entertainment systems having entertainment apparatus which include video game machines execute a game according to a game program which is read from a recording medium such as a CD-ROM or the like under the control of a manual controller while game images are being displayed on a display screen of a television receiver based on data read from the recording medium.

The entertainment apparatus and the manual controller are usually connected to each other by serial interfaces. When a clock signal is sent from the entertainment apparatus to the manual controller, the manual controller sends key switch information corresponding to manual input actions of a user in synchronism with the clock signal.

Recently, there has been developed and used a system having a manual controller which incorporates therein vibration generating means for imparting vibrations to a user in response to a request from an external drive, for example, the entertainment apparatus. While a game is in progress on the entertainment apparatus, various vibrations corresponding to manual input actions of the user are generated and imparted to the user.

In such circumstances, various types of games utilizing the above-described entertainment apparatus such as a role playing game, a shooting game, a driving game, and a fighting game are currently available on the market.

The shooting games and the fighting games are mainly directed to defeat opponents or destroy enemies by attacks. Therefore, most messages used in such games are mainly directed to provide a user with guidance for manipulating the manual controller.

The role playing games are mainly directed to provide a basic scenario through which a main character can visit a lot of places and virtually experience various events. For example, in the scenario, the main character explores a dungeon for defeating a boss monster or in search of a hidden treasure.

An amusing aspect of the role playing game is to meet many people and listen to their stories and advice for obtaining hints to solve a mystery or to develop the scenario in the game.

The story or advice is displayed as a message on the display monitor. The user may easily understand a short message comprising only a few words, for example, at a glance, even if all the words in the message are displayed in a same color. However, the user may not easily understand a long message comprising many words or more than one sentence at a glance. In this case, it is rather difficult for the user to identify a place's name, a person's name, and a monster's name or the like in the message. Therefore, the user needs to read the message repeatedly for understanding the message.

According to one example of a conventional message system, a keyword is displayed in red and the other words are displayed in green. However, in the message system, it is not possible to identify the meaning of the keyword, that is, it is not possible to identify whether the keyword is a place's name or a person's name.

In the role playing game, basically, the user needs to spend a lot of time on collecting a lot of small hints in various places in order to solve a mystery in the game. Therefore, it is difficult for the user to remember names of people, places, and monsters. Thus, it is not possible for the user to understand long messages at a glance.

Further, when a message is displayed on main objects such as a main character, i.e., when a message overlaps main objects and the main objects are hidden by the message, the user can not confirm whom the main character is talking to or the user can not confirm the speaker of the story or the hint. In this case, the user needs to move the main character for checking every object displayed on the display screen. Such checking operation is laborious and a waste of time.

SUMMARY OF THE INVENTION

It is therefore an object of the present invention to provide an entertainment system, an entertainment apparatus, a recording medium, and a program which are applicable to a game and which make unknown words in a message displayed on a display monitor to be identified easier so that a user can understand the message at a glance, thereby preventing the user from losing interest in the role playing game.

Another object of the present invention is to provide an entertainment system, an entertainment apparatus, a recording medium, and a program which are applicable to a game and which allow a message to be displayed such that the message does not overlaps main objects such as a main character so as to make it possible to confirm the speaker of the message while message is being displayed on a display monitor, thereby preventing a user from losing interest in the role playing game.

According to the present invention, an entertainment system comprises:
- an entertainment apparatus for executing various programs;
- at least one manual controller for inputting a manual control request of a user to the entertainment apparatus;
- a display monitor for displaying an image outputted from the entertainment apparatus; and
- message displaying means for displaying a message on the display monitor such that words of a same type in meaning in the message are displayed in a same color.

Further, according to the present invention, an entertainment apparatus for executing various programs is connectable to at least one manual controller for inputting a manual control request of a user to the entertainment apparatus, and connectable to a display monitor for displaying an image outputted from the entertainment apparatus,
wherein the entertainment apparatus comprises message displaying means for displaying a message on the display monitor such that words of a same type in meaning in the message are displayed in a same color.

Further, according to the present invention, a recording medium stores a program and data for use of an entertainment system, the entertainment system comprising:

an entertainment apparatus for executing various programs;

at least one manual controller for inputting a manual control request of a user to the entertainment apparatus; and a display monitor for displaying an image outputted from the entertainment apparatus;

wherein the program comprises the step of displaying a message on the display monitor such that words of a same type in meaning in the message are displayed in a same color.

Further, according to the present invention, a program is readable and executable by a computer, the program being for use of an entertainment system comprising:

an entertainment apparatus for executing various programs;

at least one manual controller for inputting a manual control request of a user to the entertainment apparatus; and a display monitor for displaying an image outputted from the entertainment apparatus;

wherein the program comprises the step of displaying a message on the display monitor such that words of a same type in meaning in the message are displayed in a same color.

With the present invention, the user can easily recognize types of unknown words in the message. For example, the user can easily recognize whether a certain word in the message is a name of a place, a name of a person, or name of a monster by the color of the word. Accordingly, it is possible for the user to understand the meaning of the message displayed on the display monitor at a glance.

Further, according to the present inveniton, by means of color distinction, i.e., changing the display colors of certain words in the message (the change of the display color may be performed by converting the color of the message text into the color of the message area, and converting the color of the message area into the color of the message text), whether a known place's name or an unknown place's name, or whether a known person' name or an unknown person' name can be distinguished, for example. Thus, even if the user is not provided with any information about the message or the user forgets a part of a previous story of the game, it is possible for the user to understand the contents of the message easily. Accordingly, the user may not feel it tedious to read the message. Therefore, if the present invention is applied to a game having a long scenario such as a role playing game, it is possible to prevent the user from losing interest in the game.

In the above described invention, message data to be processed by the message displaying means (message data to be processed in the step of displaying a message) may comprise a plurality of combinations of a data unit indicating a word to be displayed and a display color code of the word to be displayed, the display color code indicating a display color of the word corresponding to a type of the word.

Further, the message determining means (the step of determining a message) may comprise display color code setting means for (the step of) determining a type of a word having an undefined color code in the message data and defining the undefined color code based on the determined type.

Accordingly, an algorithm for displaying a message on the display monitor such that words of a same type in the message can be displayed in a same color can be easily constructed.

In the above described invention, the message displaying means (the step of displaying a message) may comprise message frame displaying means for (the step of) displaying a message frame containing the message.

Further, the message frame displaying means (the step of displaying a message) may comprise message frame determining means for (the step of) determining a display area of said message frame based on the number of characters in said message and display areas of main objects in a scene presently displayed on the display monitor.

Accordingly, a message can be displayed such that the message does not overlaps main objects such as a main character so as to make it possible to confirm the speaker of the message while message is being displayed on a display monitor.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 12 is a functional block diagram showing a system of message displaying means;

FIG. 16 is a view0 showing contents of a display color information table.

DESCRIPTION OF THE PREFERRED EMBODIMENT

An embodiment of the entertainment system according to the present invention which is applied to a video game apparatus, and an embodiment of the recording medium according to the present invention which is applied to a recording medium for storing a program and data executable by the video game apparatus will be described with reference to FIGS. 1 through 17.

Figure 1:
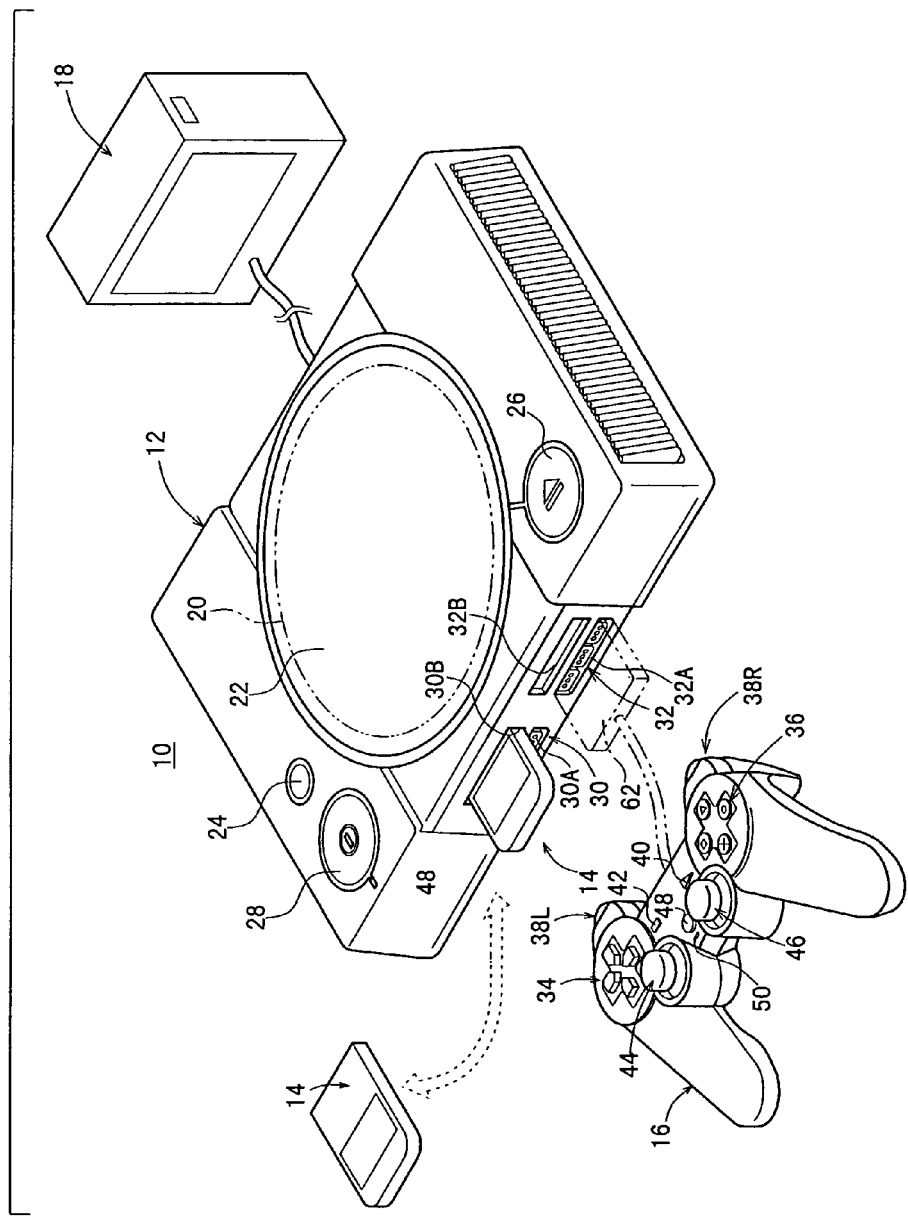
FIG. 1 is a perspective view of an entertainment system according to an embodiment of the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from a user, e.g., a game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 (or unillustrated portable information terminals having the function of the memory card 14) for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
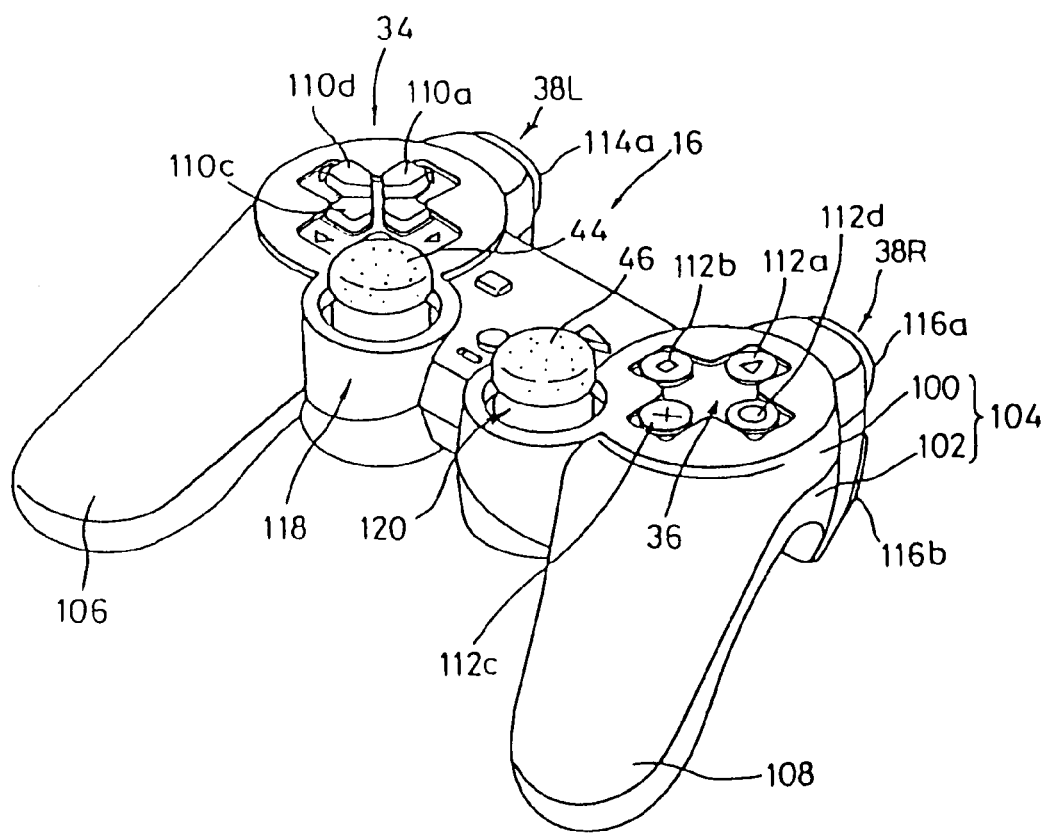
FIG. 2 is a perspective view of a manual controller.
Figure 3:
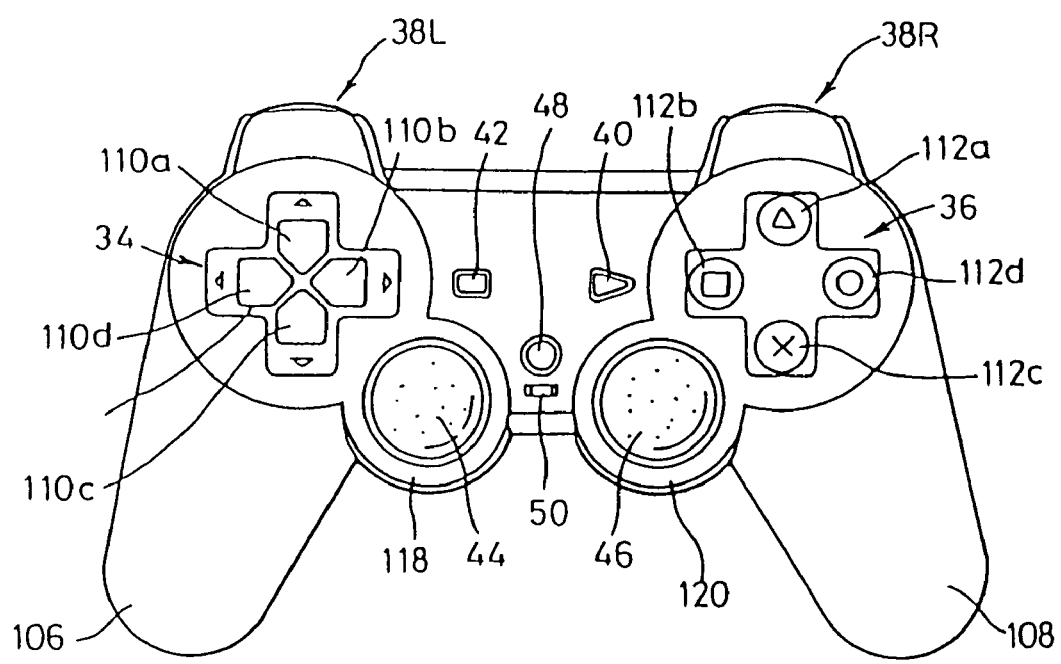
FIG. 3 is a plan view of the manual controller.

As shown in FIGS. 2 and 3, the manual controller 16 has first and second control pads 34, 36, an L (Left) button 38L, an R (Right) button 38R, a start button 40, and a selection button 42. The manual controller 16 also has joysticks 44, 46 for inputting analog control actions, a mode selection switch 48 for selecting control modes of the joysticks 44, 46, and an indicator 50 for indicating a selected control mode. The indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends and extend in the downward direction of the body of the manual controller 16.

To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises a first pressable control member (up button) 110a, a second pressable control member (right button) 110b, a third pressable control member (down button) 110c, and a fourth pressable control member (right button) 110d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises a first pressable control member (Δ button) 112a, a second pressable control member (□ button) 112b, a third pressable control member (X button) 112c, and a fourth pressable control member (○ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
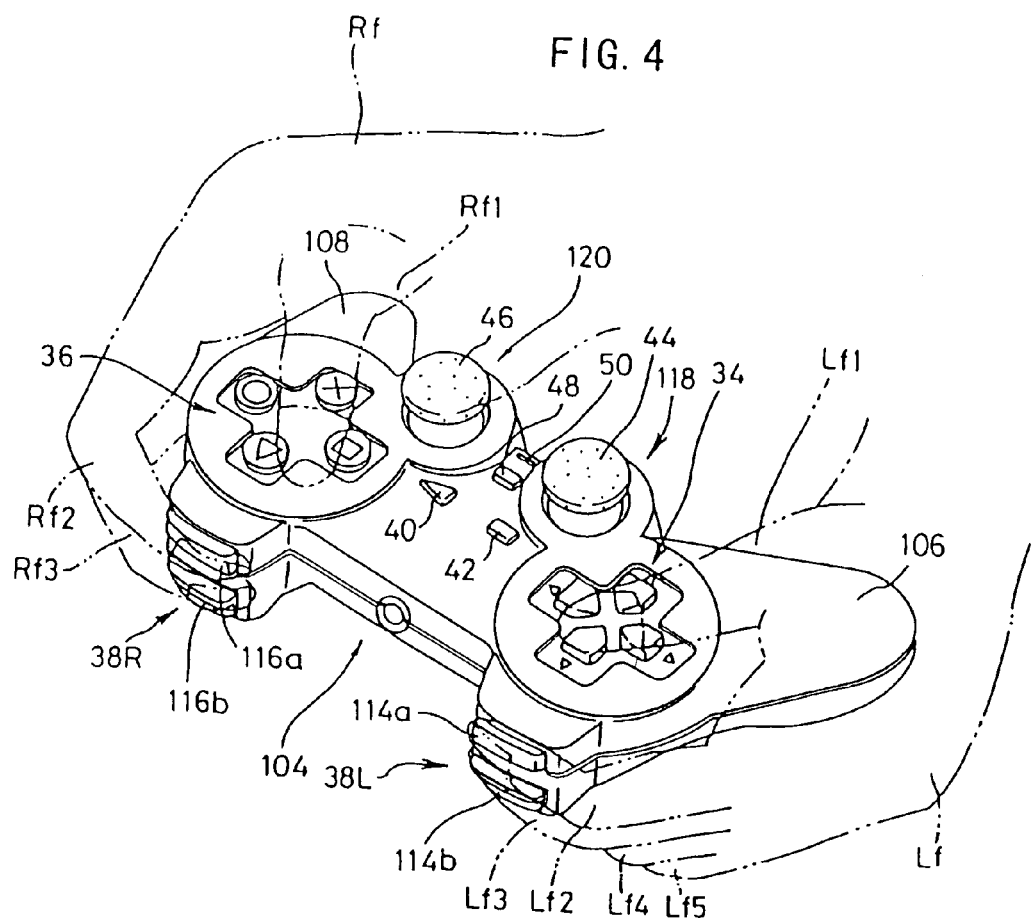
FIG. 4 is a perspective view showing a manner in which the manual controller is used.

The L button 38L and the R button 38R are disposed on a side of the housing 104 remote from the left and right grips 106, 108 and positioned respectively at the opposite ends of the housing 104. As shown in FIGS. 2 and 4, the L button 38L has a first left pressable control member (L1 button) 114a and a second left pressable control member (L2 button) 114b, and the R button 38R has a first right pressable control member (R1 button) 116a and second right pressable control member (R2 button) 116b, respectively. The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the control shaft of the left and right joy-sticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, it can also select a control mode for allowing a command signal to be inputted from the first and second analog control pads 118, 120 and selecting the function of the first through fourth pressable control members 112a, 112b, 112c, 112d of the second control pad 36 or the function of the pressable control members 114a, 114b and 116a, 116b of the L button 38L and the R button 38R. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and R1 button 116a, R2 button 116b of the R button 38R.

Figure 5:
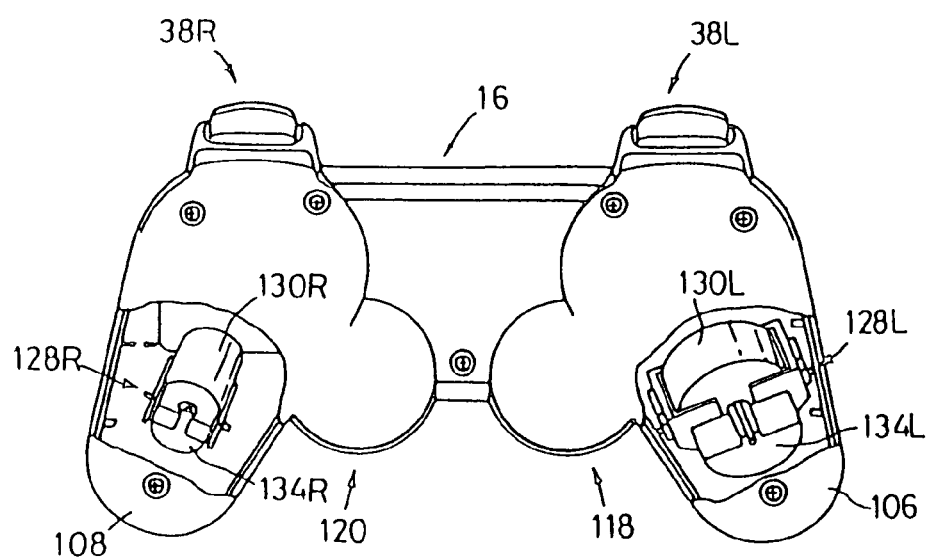
FIG. 5 is a bottom view, partly broken away, of the manual controller, showing vibration imparting mechanisms disposed respectively in left and right grips.

As shown in FIG. 5, the manual controller 16 has a pair of vibration imparting mechanisms 128L, 128R for imparting vibrations to the user in order for the user to be able to play a highly realistic game.

As shown in FIG. 5, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128L, 128R have basically the same structure except their vibration characteristics, only the right vibration imparting mechanism 128R will be described for the purpose of brevity.

The vibration imparting mechanisms 128R comprises a motor 130R energizable by a vibration generating command supplied from the entertainment apparatus 12, and an eccentric member 134R mounted eccentrically on the drive shaft of the motor 130R.

The eccentric member 134R comprises a weight in the form of a heavy metal member having a semicircular cross-sectional shape. The weight has an off-center hole defined therein in which the drive shaft of the motor 130R is fitted.

According to the vibration imparting mechanisms 128L, 128R as constructed above, when the motors 130L, 130R are energized, the drive shafts thereof rotate to cause the eccentric members 134L, 134R to rotate in an eccentric motion for thereby generating vibrations, which are imparted to the left grip 106 and the right grip 108. Then, the vibrations of the left grip 106 and the right grip 108 are applied to the hands and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

For example, the motor 130L of the left vibration imparting mechanism 128L is bigger than the motor 130R of the right vibration mechanism 128R. The rotational speed of the motor 130L varies according to a vibration value included in a vibration generating command transmitted from the entertainment apparatus 12. That is, vibrations having different frequencies can be generated depending on the vibration value. In the present embodiment, the vibration frequency of the motor 130L varies in proportion to the vibration value.

In contrast to the motor 130L of the left vibration imparting mechanism 128L, the vibration frequency of the motor 130R of the right vibration imparting mechanism 128R does not vary according to the vibration value included in the vibration generating command. The motor 130R of the right vibration imparting mechanism 128R is simply energized or deenergized according to the vibration value. If the vibration value (logic value) is "1", the motor 130R of the right vibration imparting mechanism 128R is energized. If the vibration value is "0", the motor 130R of the right vibration imparting mechanism 128R is deenergized. When the motor 130R of the right vibration imparting mechanism 128R is energized, it rotates at a constant speed to generate vibrations at a constant frequency.

In order to energize the motors 130L, 130R to vibrate the manual controller 16 in its entirety, a bidirectional communication function needs to be provided between the manual controller 16 and the entertainment apparatus 12. This bidirectional communication function will be described later on.

Next, circuit arrangements of the entertainment apparatus 12 and the manual controller 16 will be described below with reference to FIGS. 6 through 8.

Figure 6:
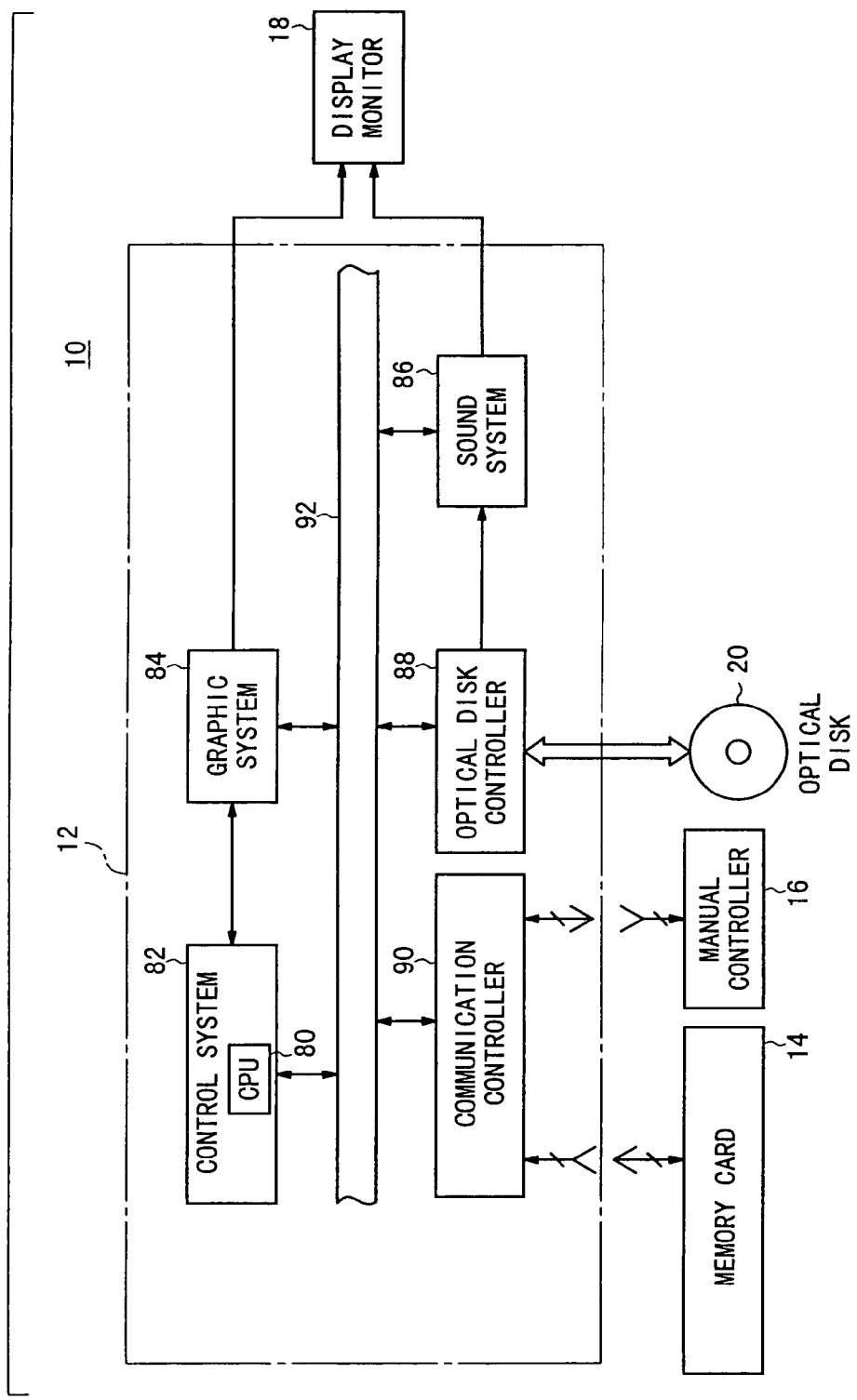
FIG. 6 is a block diagram showing a circuit arrangement of the entertainment apparatus.

As shown in FIG. 6, the entertainment apparatus 12 comprises a control system 82 including a central processing unit (CPU) 80 and peripheral devices thereof, a graphic system 84 including a frame buffer (not illustrated) and a graphic processing unit (GPU) for rendering image data in the frame buffer, a sound system 86 including a sound processing unit (SPU) for generating music sounds and sound effects, an optical disk controller 88 for controlling the readout of the optical disk 20 in which application programs and data are stored, a communication controller 90 for controlling the inputting of data into and outputting of data from the manual controller 16 and the memory card 14, and a system bus 92 to which the control system 82, the graphic system 84, the sound system 86, the optical disk controller 88, and the communication controller 90 are connected.

Video and audio signals generated by and outputted from the graphic system 84 and the sound system 86 are supplied to the display monitor 18 to display images on the monitor screen of the display monitor 18 and reproduce sounds from the speakers of the display monitor 18.

Figure 7:
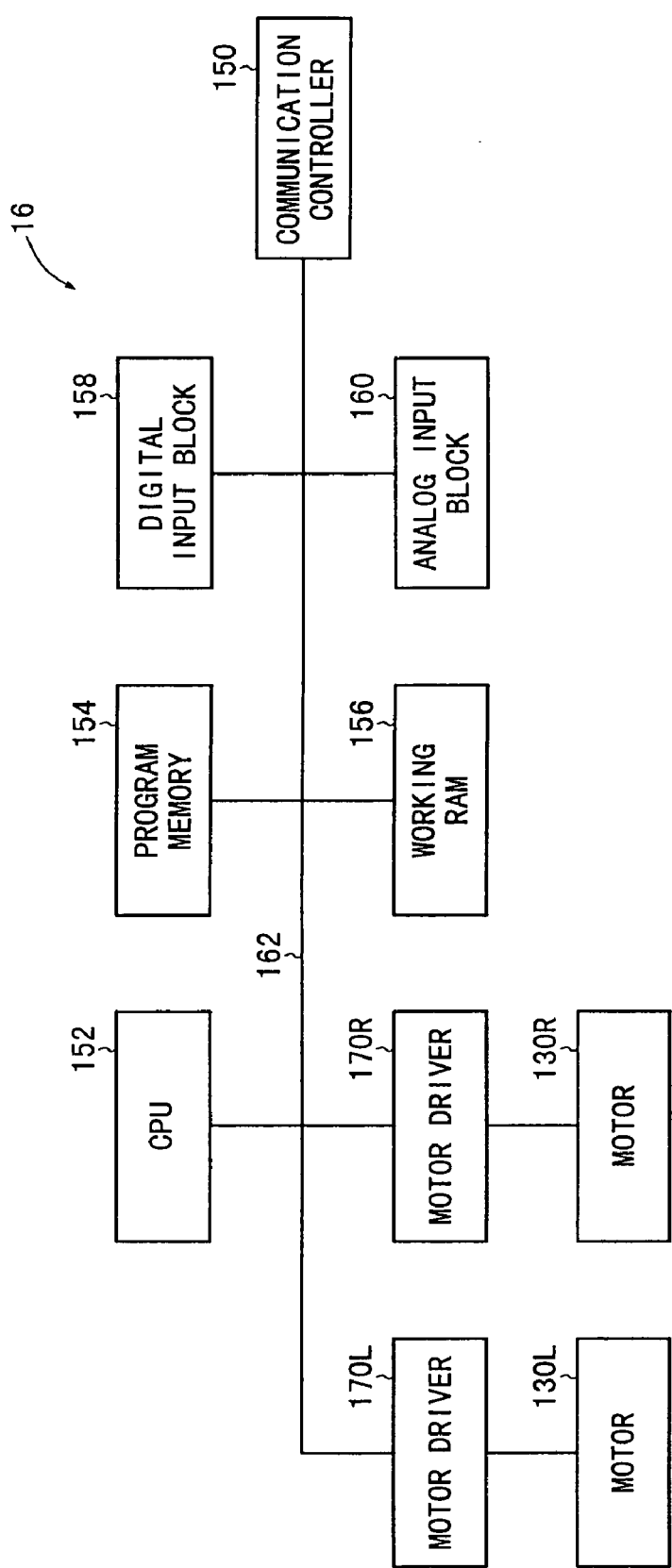
FIG. 7 is a view showing a circuit arrangement of the manual controller.

As shown in FIG. 7, the manual controller 16 comprises a communication controller 150, a CPU 152, a program memory 154, a working RAM 156, a digital input block 158, an analog input block 160, the left motor driver 170L, the left motor 130L, the right motor driver 170R, and the right motor 130R. These components of the manual controller 16 are connected to a bus 162.

The digital input block 158 functions as a manual input controller for the first through fourth pressable control members 110a–110d of the first control pad 34 and the first through fourth pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 90 of the entertainment apparatus 12 (see FIG. 6), for example, for data communication with the entertainment apparatus 12.

Figure 8:
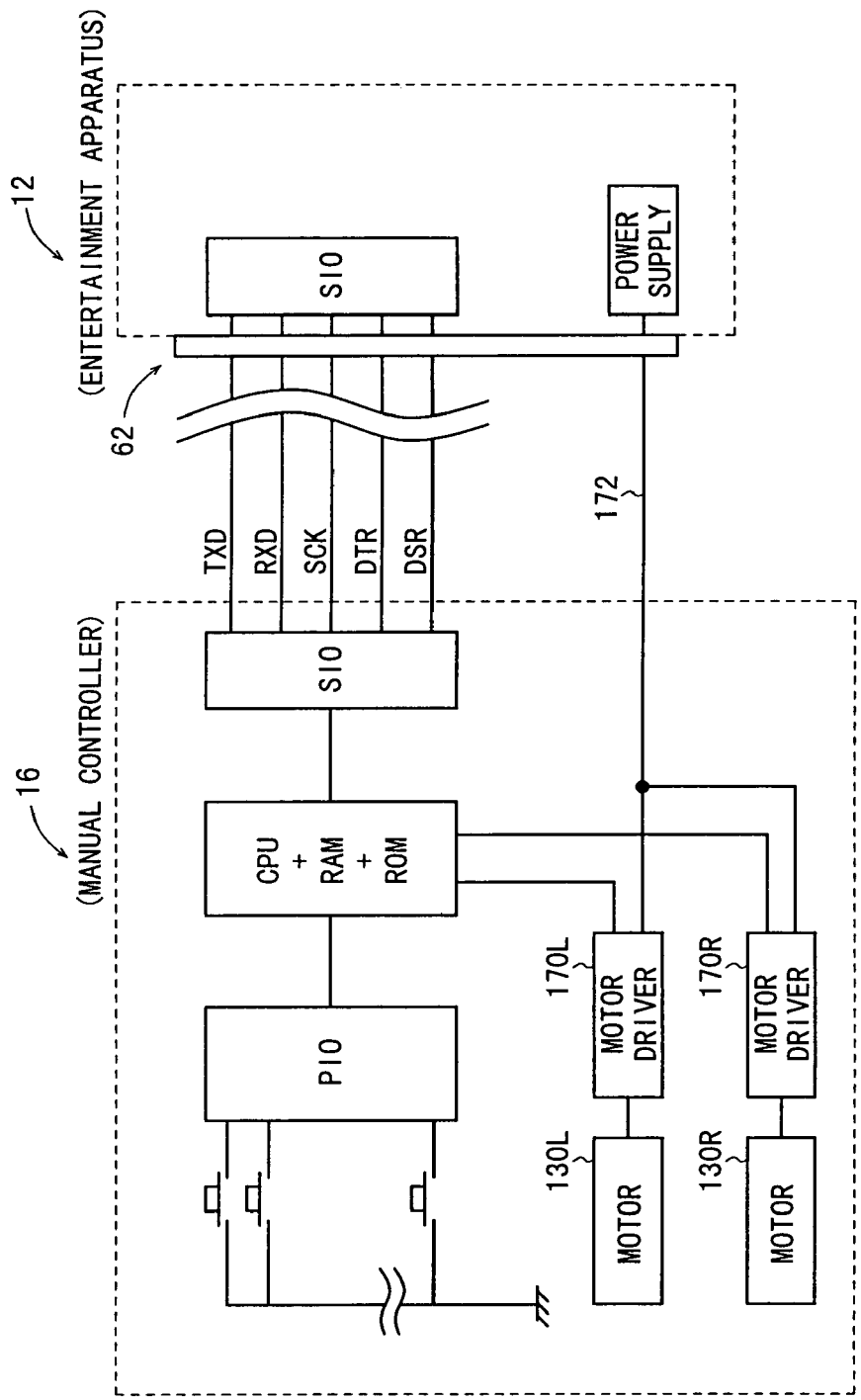
FIG. 8 is a block diagram showing main components for carrying out bidirectional serial communications between the manual controller and the entertainment apparatus.

As shown in FIG. 8, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering manipulation data from a plurality of control buttons, a one-chip microcomputer comprising a CPU, a RAM, and a ROM, and motor drivers 170R, 170L for energizing the motors 130R, 130L of the vibration imparting mechanisms 128R, 128L. The motors 130R, 130L are energized for rotation by voltages and currents supplied from the corresponding motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the manual controller 16 and the entertainment apparatus 12. Other structural details of the entertainment apparatus 12 are omitted from illustration in FIG. 8.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. As shown in FIG. 8, this cable further includes a power line 172 extending from a power supply in the entertainment apparatus 12 and connected to the motor drivers 170R, 170L in the manual controller 16 for supplying electric energy to energize the motors 130R, 130L.

A process of bidirectional serial communication between the manual controller 16 and the entertainment apparatus 12 will be described below. In order for the entertainment apparatus 12 to communicate with the manual controller 16 to read manipulation data from the digital input block 158 and the analog input block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends manipulation data via the data transfer signal line TXD to the manual controller 16, which sends the manipulation data from the digital input block 158 and the analog input block 160 to the entertainment apparatus 12 via the data transfer signal line RXD. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly manipulation data from the digital input block 158 and the analog input block 160 to the entertainment apparatus 12, and the entertainment apparatus 12 can send a vibration generating command for energizing the motors 130R, 130L of the vibration imparting mechanisms 128R, 128L via the data transfer signal line TXD to the manual controller 16.

The vibration generating command for energizing the motors 130R, 130L has been established in advance in the optical disk 20 set in the entertainment apparatus 12. Alternatively, the vibration generating command is generated by the entertainment apparatus 12.

Next, a characteristic function of the entertainment system 10 according to the present embodiment will be described below with reference to FIGS. 9 through 17.

The characteristic function of the entertainment system 10 is to display a message on the display monitor 18 such that words of a same type in the message can be displayed in a same color.

A message system of a role playing game utilizing the characteristic function of the entertainment system 10 will be described hereinbelow specifically.

Figure 9:
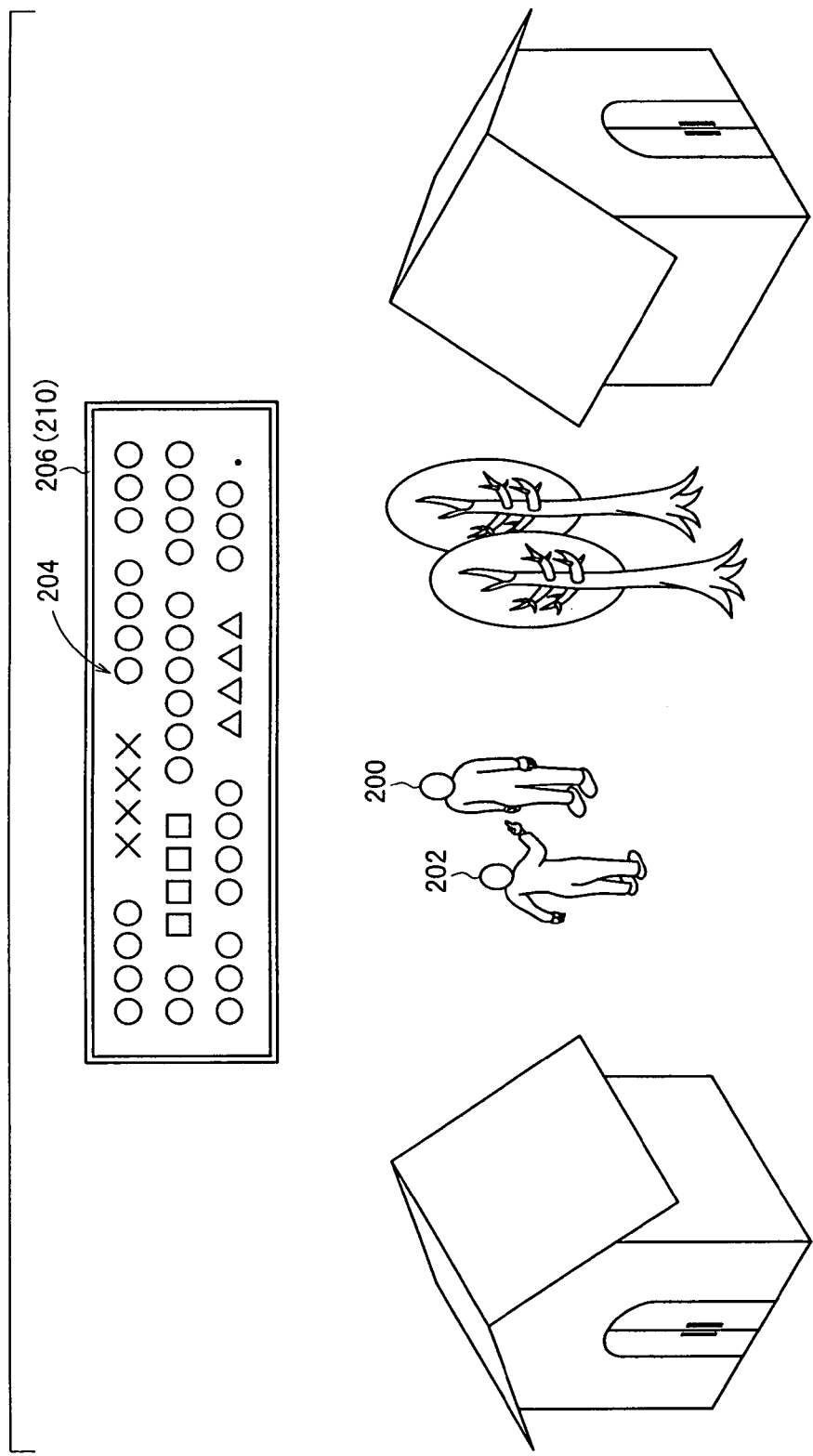
FIG. 9 is a view showing an example of a message displayed in a rectangular frame.

According to the message system, as shown in FIG. 9, when the user controls a main character 200 to approach a villager 202 and inputs a command for obtaining information from the villager 202 by pressing the decision button 112*d*, for example, a message 204 is displayed in a message frame 210 on the display monitor 18. The message 204 may contain keywords for giving necessary information to the user such as a hint to solve a mystery in the game.

When the message 204 is a long sentence or contains more than one sentence, as shown in FIG. 9, the message 204 may be displayed in a rectangular frame 206.

Figure 10:
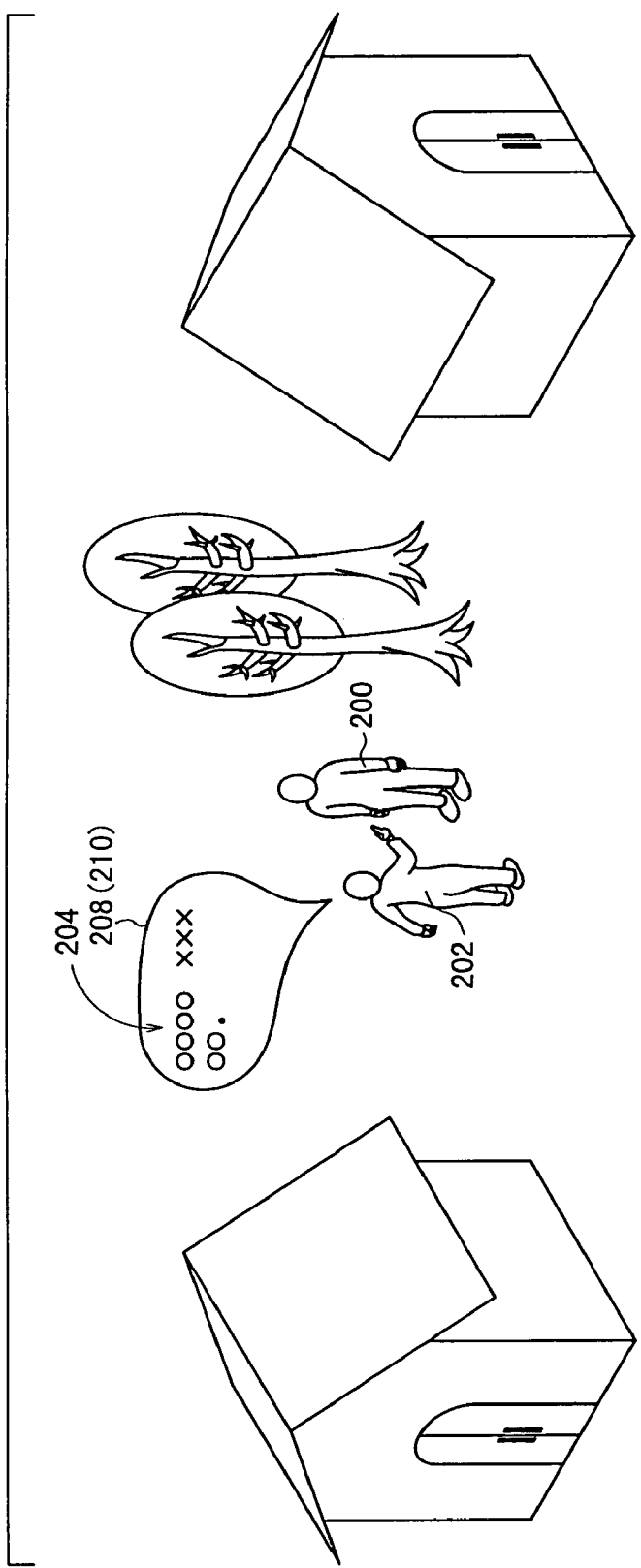
FIG. 10 is a view showing an example of a message displayed in a speech balloon.

When the message 204 is a short sentence comprising only a few words, as shown in FIG. 10, the message 204 may be displayed in a speech balloon 208 near the speaker (villager) 202.

As the color of the message area in the message frame 210 such as the rectangular frame 206 or the balloon frame 208, white and gray are used, for example. If the tone of a background color is like a tone of a primary color or a dark color, white is used as the color of the message area. If the tone of a background color is like a white tone, gray is used as the color of the message area.

The message frame 210 displayed on the display monitor 10 does not overlap main objects (important objects) such as the main character 200 and the speaker (villager) 202.

In FIG. 9, it is assumed that symbols "X" constitute a word indicating a name of a person, symbols "□" constitute a word indicating a name of a place, and symbols "Δ" constitutes a word indicating a name of a monster. The other symbols "○" indicate the rest of the message 204. If the person indicated by "X" is a person whom the main character 200 has already met, the name of the person (symbols "X") is displayed in light blue, for example. If the person indicated by "X" is not a person whom the main character 200 has already met, the name of the person is displayed in blue, for example.

Similarly, if the place indicated by "□" is a place which the main character 200 has already visited, the name of the place (symbols "□") is displayed in yellow, for example. If the place indicated by "□" is not a place which the main character 200 has already visited, the name of the place is displayed in brown, for example. If the monster indicated by "Δ" is a monster with which the main character 200 has already been in a battle, the name of the monster (symbols "Δ") is displayed in pink, for example. If the monster indicated by "Δ" is not a monster with which the main character 200 has already been in a battle, the name of the monster is displayed in red, for example. The rest of the message indicated by the other symbols "○" is displayed in green, for example. In this manner, the words in the message are categorized and distinguished by different colors.

Figure 11:
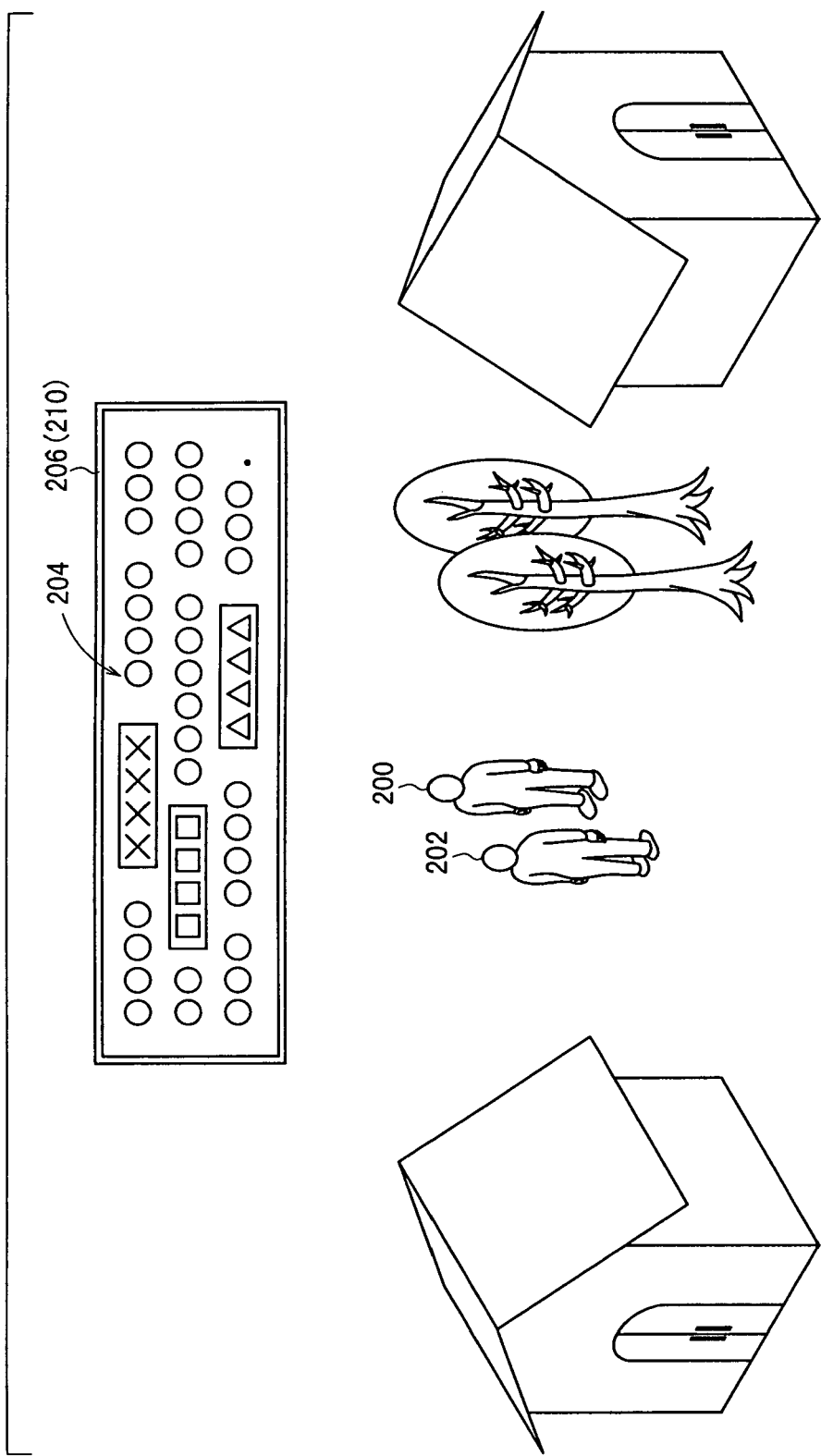
FIG. 11 is a view showing an example of a message displayed in a rectangular frame in which colors are interchanged between the message text and the message area in some parts of the message.

Alternatively, as shown in FIG. 11, the color distinction can be performed by converting the color of the message text into the color of the message area, and converting the color of the message area into the color of the message text.

Specifically, if the person indicated by "X" is a person whom the main character 200 has already met, as shown in FIG. 9, the name of the person (symbols "X") is displayed in blue, for example, and the message area around the name of the person in blue is displayed in white, for example. If the person indicated by "X" is not a person whom the main character 200 has already met, as shown in FIG. 11, the name of the person is displayed in white, and the message area around the name of the person in white is displayed in blue.

If the place indicated by "□" is a place which the main character 200 has already visited, as shown in FIG. 9, the name of the place (symbols "□") is displayed in yellow, for example, and the message area around the name of the place in yellow is displayed in white. If the place indicated by "□" is not a place which the main character 200 has already visited, as shown in FIG. 11, the name of the place is displayed in white, and the message area around the name of the person in white is displayed in yellow. If the monster indicated by "Δ" is a monster with which the main character 200 has already been in a battle, as shown in FIG. 9, the name of the monster (symbols "Δ") is displayed in red, for example, and the message area around the name of the monster in red is displayed in white. If the monster indicated by "Δ" is not a monster with which the main character 200 has already been in a battle, as shown in FIG. 11, the name of the monster is displayed in white, and the message area around the name of the monster in white is displayed in red.

Next, an example of software (message displaying means 300) for carrying out the characteristic function of the entertainment system 10 will be described with reference to FIGS. 12 through 17.

The message displaying means 300 can be supplied from a randomly accessible recording medium such as a CD-ROM, a memory card 14 or the like to the entertainment system 10. Alternatively, the message displaying means 300 can be downloaded via a network such as the Internet or downloaded via a satellite communication or the like to the entertainment system 10. In the following explanation, it is assumed that the message displaying means 300 is supplied from an optical disk (e.g., CD-ROM) 20.

Specifically, the optical disk 20 is played back by the optical controller 88 to read the message displaying means 300 and the read message displaying means 300 is stored in a main memory in the control system 82 of the entertainment apparatus 12 by a predetermined process. Thereafter, the message displaying means 300 is executed by the CPU 80 of the control system 82 of the entertainment apparatus 12.

As shown in FIG. 12, the message displaying means 300 comprises first determining means 302, second determining means 304, third determining means 306, and fourth determining means 308. The first determining means 302 determines the type, the size, and the display area of the message frame 210 based on the number of characters in the message 204 and display areas of main objects or the like. The second determining means 304 determines the number of lines in the message 204 based on the number of characters in the message 204 and the display area of the message frame 210.

The third determining means 306 determines the maximum number of characters per line based on the number of characters and the number of lines in the message 204. The fourth determining means 308 determines coordinates for starting to display respective lines in the message 204 based on the display area of the message frame 210 and the number of lines in the message 204.

Further, as shown in FIG. 12, the message displaying means 300 comprises display color code setting means 310, message data generating means 314, and message data outputting means 316. The display color code setting means 310 sets a display color code for each of undefined display color codes in unprocessed message data dDm. The message data generating means 314 generates message data Dm by dividing the unprocessed message data dDm into line unit data sections each comprising one-line data (i.e., the data including several codes and data units for displaying one line of the message 204) based on the number of lines in the message 204. Further, the message data generating means 314 stores the generated message data Dm in a display buffer 312. The message data outputting means 316 starts to display the message 204 from a point having coordinates indicated by a coordinate code such that each of character strings of data units is displayed in a color indicated by a display color code.

The message data generating means 314 comprises line unit setting means 318, display color code adding means 320, and coordinate code adding means 322. The line unit setting means 318 generates the message data Dm by dividing the unprocessed message data dDM into line unit data sections each comprising one-line data. Further, the line unit setting means stores the generated message data Dm in the display buffer 312. The display color code adding means 320 adds a display color code to each head of the line unit data sections of second and subsequent lines. The coordinate code adding means 320 adds a coordinate code to each head of the line unit data sections of respective lines.

An example of the unprocessed message data dDm and processed message data Dm will be described below with reference to FIGS. 13A and 13B.

Figures 13A, 13B:
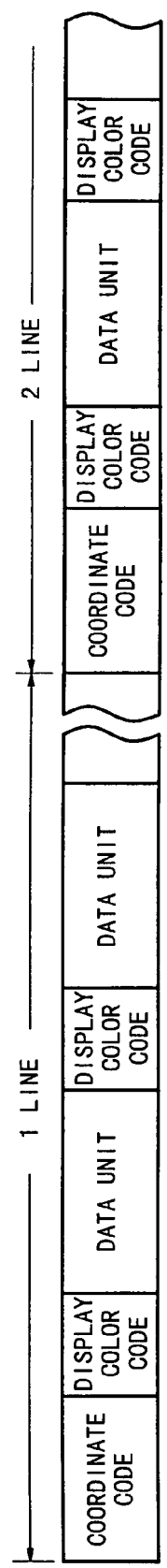
FIG. 13A is a view showing message data to be processed.
FIG. 13B is a view showing message data processed for displaying a message.

As shown in FIG. 13A, the message data dDm to be processed by the message displaying means 300 comprises a plurality of combinations of a display color code and a data unit. Each data unit comprises data of a character string indicative of a word or the like. For example, in FIG. 9, a display color code corresponding to character strings of the symbols "◯" is defined to indicate green. Display color codes corresponding to character strings of the symbols "X", "□", and "△" are not defined.

As shown in FIG. 13B, the message data Dm processed by the message displaying means 300 and stored in the display buffer 312 comprises line unit data sections. Each of the data sections comprises a coordinate code, and a plurality of combinations of a display color code and data unit. The coordinate code is positioned at the head of the data section. Each character string (word) indicated by a data unit is displayed in a color indicated by a display color code positioned just before the data unit.

Next, the processing sequence of the message displaying means 300 will be described with reference to FIGS. 14 through 17.

Figure 14:
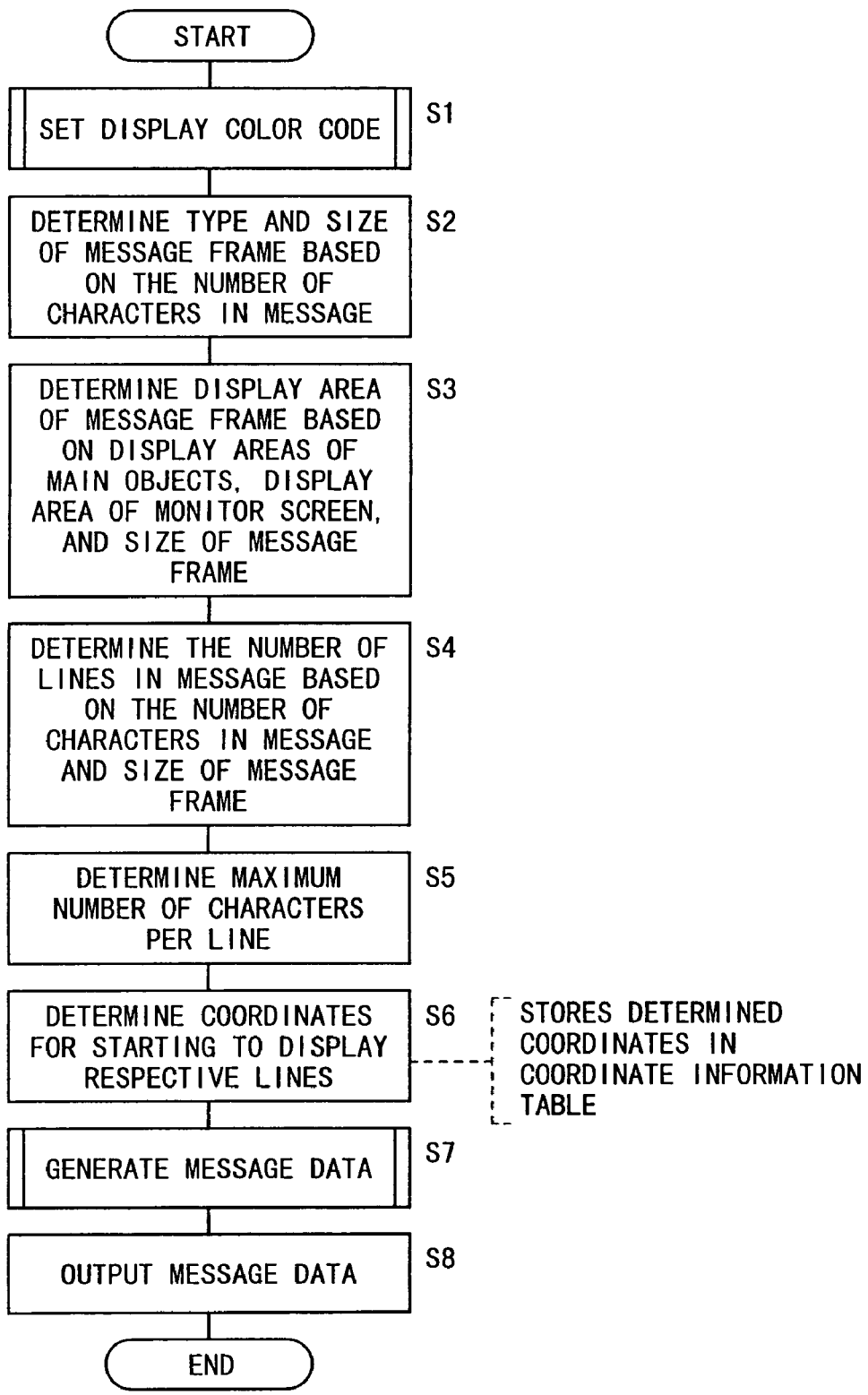
FIG. 14 is a flow chart showing a processing sequence of the message displaying means.
Figure 15:
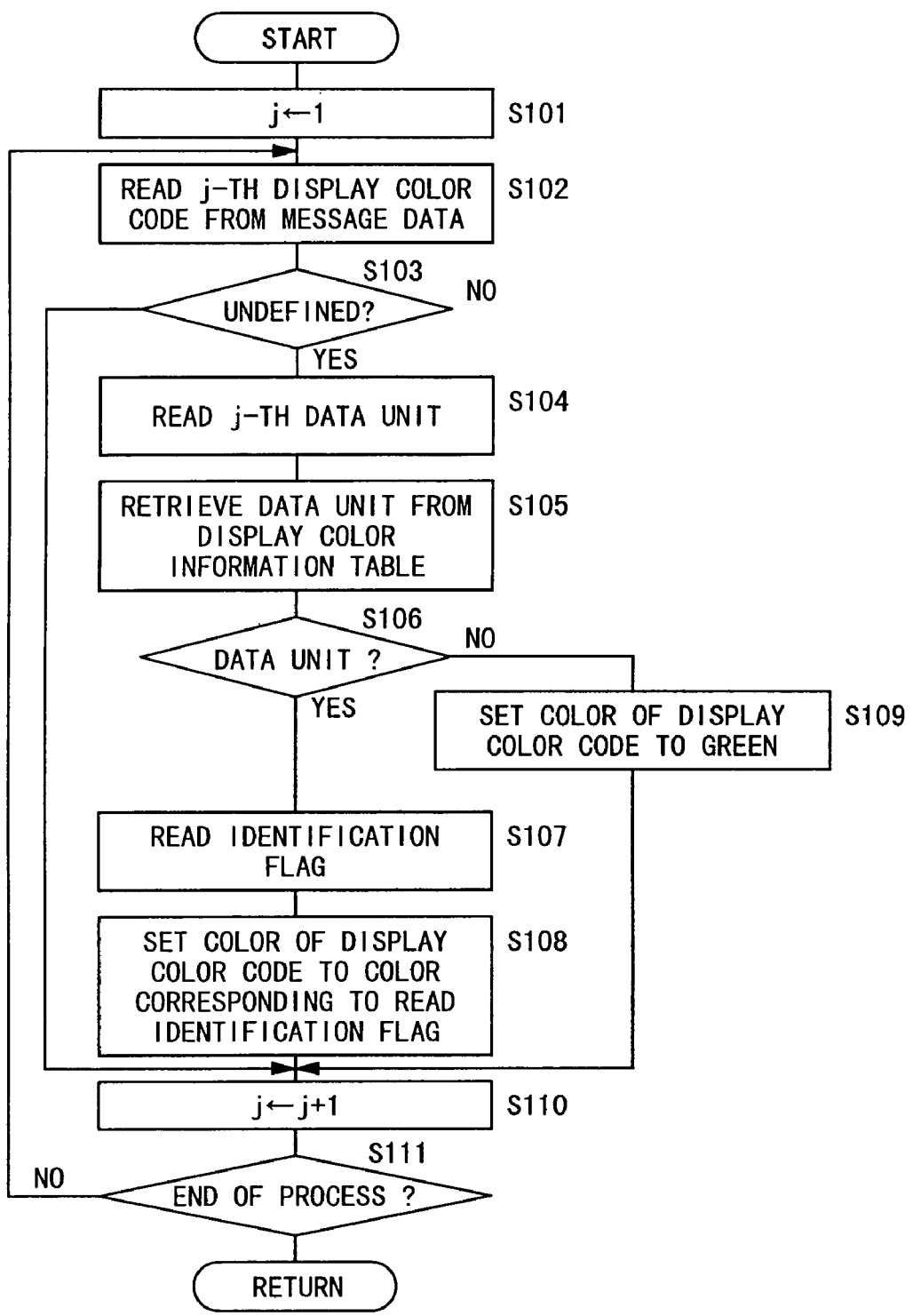
FIG. 15 is a flow chart showing a processing sequence of display color code setting means.

In Step S1 of FIG. 14, the process of the display color code setting means 310 is performed. The process of the display code setting means 310 will be described specifically with reference to FIG. 15.

In Step S101, the display color code setting means 310 initializes an index register j for retrieval of a display color code by storing a value "1" in the index register j.

Then, in Step S102, the display color code setting means 310 read the j-th display color code of present message data dDm to be displayed on the display monitor 18.

Next, in Step S103, the display color code setting means 310 determines whether the read display color code is defined or not. If it is determined that the display color code is not defined, control goes to Step S104 for reading the j-th data unit.

Then, in Step S105, the display color code setting means 310 retrieves the read data unit from a display color information table 330.

As shown in FIG. 16, for example, the display color information table 330 includes a plurality of records each comprising a data unit and an identification flag. The data units of the display color information table 300 comprise data units to which the undefined display color code is assigned.

The identification flag is categorized into three name units i.e., a person's name unit, a place's name unit, and a monster's name unit. Since each of the name units comprises two bits (first bit and second bit), the three name units comprise six bits in total. Only one of the six bits can have a value of "1" and the other five of the six bits have a value of "0".

If a data unit indicates a name of a person and the main character 200 in the game has already met the person, the first bit of the person's name unit has the value of "1". If a data unit indicates a name of a person and the main character 200 has not met the person, the second bit of the person's name unit has the value of "1".

If a data unit indicates a name of a place and the main character 200 has already visited the place, the first bit of the place's name unit has the value of "1". If a data unit indicates a name of a place and the main character 200 has not visited the place, the second bit of the place's name unit has the value of "1".

If a data unit indicates a name of a monster and the main character 200 has already been in a battle with the monster, the first bit of the monster's name unit has the value of "1". If a data unit indicates a name of a monster and the main character 200 has not been in a battle with the monster, the second bit of the monster's name unit has the value of "1".

If the six bit value of an identification flag is "100000", the display color is defined as light blue. If the six bit value of an identification flag is "010000", the display color is defined as blue. If the six bit value of an identification flag is "001000", the display color is defined as yellow. If the six bit value of an identification flag is "000100", the display color is defined as brown. If the six bit value of an identification flag is "000010", the display color is defined as pink. If the six bit value of an identification flag is "000001", the display color is defined as red.

The routine in FIG. 15 will be described again from Step S106. In Step S106, the display color code setting means 310 determines whether the j-th data unit is included in the display color information table 330 or not. If it is determined that the j-th data unit is included in the display color information table 330, control goes to Step S107 for reading an identification flag stored in a record corresponding to the j-th data unit.

Then, in Step S108, the color of the undefined display color code is set to a color corresponding to the read identification flag.

If it is determined that the j-th data unit is not included in the display color information table 330 in Step S106, control goes to Step S109 for setting the color of the display color code to green.

When the process in Step S108 or Step S109 is finished, or if it is determined that the display color code is defined in Step S103, control goes to Step S110 for updating the value of the index register j to be incremented by 1. Thereafter, in Step S111, the display code setting means 310 determines whether the display color code setting process has been finished or not. Specifically, it is determined whether all the color codes in the message data dDm have been processed or not. If it is determined that any of the color codes in the message data have not been processed, control goes back to Step S102 for performing the process of setting the next display color code. That is, if it is determined that the display color code of a data unit is not defined, the data unit is retrieved from the display color information table 330 and the display color code of the data unit is defined based on an identification flag corresponding to the data unit in the display color information table 330. If it is determined that all the color codes in the message data dDm have been processed, the process of the display color code setting means 310 is brought to an end.

The main routine in FIG. 14 will be described again from Step S2.

In Step S2, the first determining means 302 determines the type and size of the message frame 210 based on the number of characters in the message 204 to be displayed. As shown in FIGS. 9 and 10. The types of the message frame 210 include the rectangular frame 206 and the speech balloon 208.

In Step S3, the first determining means 302 determines the display area of the message frame 210 based on display areas of main objects such as the main character 200 and the next speaker of the message 204 (villager 202), the display area of the screen (actual display area of the display monitor 18), and the size of the message frame 210.

In Step S4, the second determining means 302 determines the number of lines in the message 204 based on the number of characters in the message 204 and the size of the message frame 210.

In Step S5, the third determining means 304 determines the maximum number of characters per line based on the number of characters and the number of lines in the message 204.

In Step S6, the fourth determining means 308 determines coordinates for starting to display respective lines in the message 204 and stores the determined coordinates in a coordinate information table 332. Then, control goes to Step S7 for performing the process of the message data generating means 314. The process of the message data generating means 314 will be described specifically with reference to FIG. 17.

Figure 17:
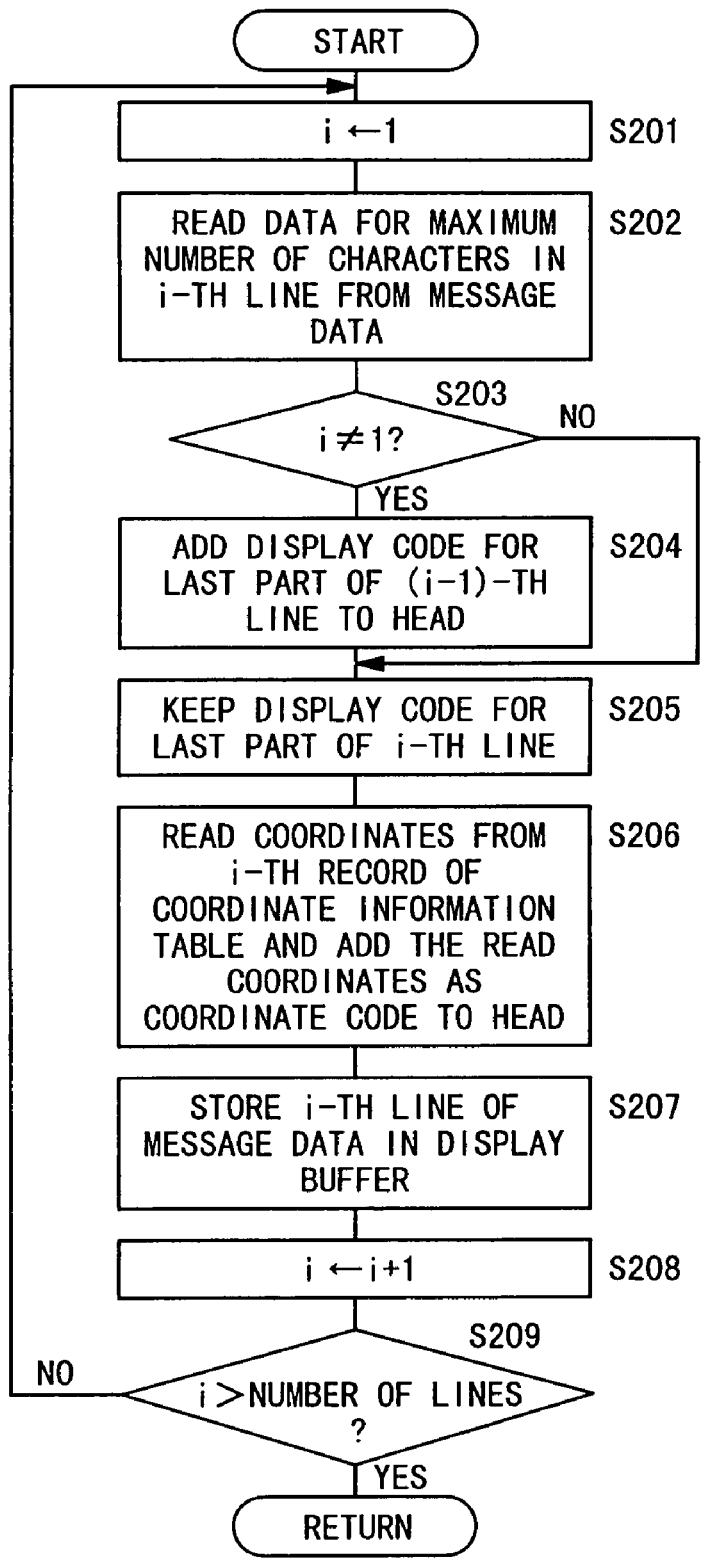
FIG. 17 is a flow chart showing a processing sequence of message data generating means.

In Step S201 of FIG. 17, the message data generating means 314 initializes an index register i used for updating the number of lines by storing a value "1" in the index register i.

Then, in Step S202, the line unit setting means 318 reads data for the maximum number of characters in one line concerning the i-th line of the message 204 from message data dDm (message data dDmi for the i-th line of the message 204).

Thereafter, in Step S203, the line unit setting means 318 determines whether the message data dDmi to be processed is the message data dDml for the first line of the message 204 or not. Specifically, the line unit setting means 318 determines whether the value of the index register i is "1" or not.

If it is determined that the value of the index register i is not "1", i.e., if it is determined that the message data ddmi is not the message data dDml, control goes to Step S204. In Step S204, the display color code adding means 320 adds the display code for the last part of the (i−1)-th line of the message data dDm(i−1) to the head of the i-th line of message data dDmi.

When the process in Step S204 is finished, or if it is determined that the message data dDmi is the message data dDml, control goes to step S205. In Step S205, the display color code adding means 320 keeps the display code for the last part of the i-th line of the message data dDMi.

Next, in Step S206, the coordinate code adding means 322 reads coordinate data from the i-th record of the coordinate information table 332 and add the read coordinate data as a coordinate code to the head of the i-th line of the message data dDMi before the display color code.

Then, in Step S207, the line unit setting means 318 stores the i-th line of the message data dDMi in the display buffer 312.

Thereafter, in Step S208, the value of the index register i is updated to be incremented by 1. Then, control goes to Step S209. In Step S209, the line unit setting means 318 determines whether all the present message data dDm to be displayed on the display monitor 18 has been processed or not. Specifically, the line unit setting means 318 determines whether the value of the index register i is grater than the determined number of lines or not.

If it is determined that the value of the index register i is not grater than the determined number of lines, that is, if it is determined that any the present message data dDm to be displayed on the display monitor 18 has not been processed, the control goes back to Step S202 for adding the next display color code and the next coordinate code to the next line of the message data dDMi.

If it is determined that the value of the index register i is grater than the determined number of lines, i.e., when the above process is finished for every line of the message data dDm, the process of the message data generating means 314 is brought to an end.

The main routine in FIG. 14 will be described again from Step S8. In Step S8, the message data outputting means 316 outputs the message data Dm stored in the display buffer 312 on the display monitor 18 for displaying words, i.e., character strings of data units in the message data Dm. The message data outputting means 316 starts displaying the message 204 such that each line of the message 204 is displayed from a point having coordinates indicated by a coordinate code and each character string in the message 204 is displayed in a color indicated by a display color code.

When the process in Step S8 is finished, the process of the message displaying means is brought to an end.

As described above, according to the embodiment of the present invention, the entertainment system 10 displays the message 204 on the display monitor 18 such that words of a same type in the message 204 can be displayed in a same color. That is, the user can easily recognize types of unknown words in the message 204. For example, the user can easily recognize whether a certain word in the message 204 is a name of a place, a name of a person, or a name of a monster by the color of the word. Accordingly, it is possible for the user to understand the meaning of the message 204 displayed on the display monitor 18 at a glance.

Further, according to the present embodiment, by means of color distinction, i.e., changing the display colors of certain words in the message 204 (the change of the display color may be performed by converting the color of the message text into the color of the message area, and converting the color of the message area into the color of the message text), whether a known place's name or an unknown place's name, or whether a known person' name or an unknown person' name can be distinguished. Thus, even if the user is not provided with any information about the message 204 in advance or the user forgets a part of previous story of the game, it is possible for the user to understand the contents of the message 204 easily. Accordingly, the user may not feel it tedious to read the message 204. Therefore, if the present embodiment is applied to a game having a long scenario such as a role playing game, it is possible to prevent the user from losing interest in the game.

Further, according to the present embodiment, the message data dDm to be processed for displaying the message 204 comprises a plurality of combinations of a data unit indicating a word such as a character string to be displayed on the display monitor 18 and a display color code indicating a display color which corresponds to the type of the word to be displayed.

In particular, when an undefined display color code is included in the message data dDm, the type of a word corresponding to the undefined color code is defined and the color of the undefined color code is defined based on the determined type of the word. Accordingly, an algorithm for displaying a message on the display monitor 18 such that words of a same type in the message can be displayed in a same color can be easily constructed.

Further, according to the entertainment system 10 of the present embodiment, the message frame 210 containing the message 204 is displayed. In particular, the display area of the message frame 10 is determined based on the number of characters in the message 204 and display areas of main objects in a scene presently displayed on the display monitor 18. Thus, the message 204 is displayed such that the message 204 does not overlap the main objects such as the main character 200. Accordingly, the movement of the speaker (for example, the villager 202) can be easily recognized while the message 204 is being displayed.

Though the message displaying means 300 has been described in connection with a role playing game, it is to be understood that the message displaying means 300 can be applicable to a game of other types.

The entertainment system, the entertainment apparatus, and the recording medium, and the program shall not be limited to the particular embodiment disclosed herein. It will be apparent to a person skilled in the art that numerous modifications and variations may be made without departing from the spirit and scope of the invention.

What is claimed is:

1. A recording medium storing a program for use in an entertainment system, the program for causing the entertainment system to perform steps of:
   receiving a manual control request from a manual controller to control a first character to approach a second character;
   receiving a command from the manual controller to obtain information from the second character;
   displaying a message in a message frame on a display in response to the command;
   including in the message at least one of a name of a person, a name of a place, and a name of a monster;
   if the name of a person is included in the message, displaying the name of the person in a first color if the first character has already met the person, and displaying the name of the person in a second color if the first character has not already met the person;
   if the name of a place is included in the message, displaying the name of the place in a third color if the first character has already visited the place, and displaying the name of the place in a fourth color if the first character has not already visited the place; and
   if the name of a monster is included in the message, displaying the name of the monster in a fifth color if the first character has already been in battle with the monster, and displaying the name of the monster in a sixth color if the first character has not already been in battle with the monster.

2. A recording medium according to claim 1, wherein message data to be processed in said step of displaying a message comprises a plurality of combinations of a data unit indicating a word to be displayed and a display color code of said word to be displayed, said display color code indicating a display color of said word corresponding to a type of said word.

3. A recording medium according to claim 2, wherein said step of displaying a message comprises a step of determining a type of a word having an undefined color code in said message data and defining said undefined color code based on the determined type.

4. A recording medium according to claim 1, wherein said step of displaying a message comprises a step of determining a display area of said message frame based on a number of characters in said message and display areas of main objects in a scene presently displayed on said display.

5. A recording medium according to claim 1, wherein said step of displaying a message comprises a step of determining whether an event or a condition occurs.

6. A recording medium according to claim 1, wherein said step of displaying a message comprises a step of displaying the message on said display such that a color of a word of a type in said message is dependent on previous manual control requests.

7. An entertainment system comprising:
   an entertainment apparatus for executing various programs;
   at least one manual controller for inputting information to said entertainment apparatus;
   a display for displaying an image outputted from said entertainment apparatus;
   means for receiving a manual control request from the manual controller to control a first character to approach a second character;
   means for receiving a command from the manual controller to obtain information from the second character;
   means for displaying a message in a message frame on the display in response to the command, wherein the message includes at least one of a name of a person, a name of a place, and a name of a monster;
   a person's name unit configured to indicate that the name of the person should be displayed in a first color if the first character has already met the person, and configured to indicate that the name of the person should be displayed in a second color if the first character has not already met the person;
   a place's name unit configured to indicate that the name of the place should be displayed in a third color if the first character has already visited the place, and configured to indicate that the name of the place should be displayed in a fourth color if the first character has not already visited the place; and a monster's name unit configured to indicate that the name of the monster should be displayed in a fifth color if the first character has already been in battle with the monster, and configured to indicate that the name of the monster should be displayed in a sixth color if the first character has not already been in battle with the monster.

8. An entertainment system according to claim 7, wherein message data to be processed by said means for displaying a message comprises a plurality of combinations of a data unit indicating a word to be displayed and a display color code of said word to be displayed, said display color code indicating a display color of said word corresponding to a type of said word.

9. An entertainment system according to claim 8, wherein said means for displaying a message comprises display color code setting means for determining a type of a word having an undefined color code in said message data and defining said undefined color code based on the determined type.

10. An entertainment system according to claim 7, wherein said means for displaying a message comprises message frame determining means for determining a display area of said message frame based on a number of characters in said message and display areas of main objects in a scene presently displayed on said display.

11. An entertainment system according to claim 7, wherein said means for displaying a message is configured to determine if an event or a condition occurs.

12. An entertainment system according to claim 7, wherein said means for displaying a message includes means for displaying the message on said display such that a color of a word of a type in said message is dependent on previous manual control requests.

* * * * *